(12) United States Patent
Krogh et al.

(10) Patent No.: US 11,907,322 B2
(45) Date of Patent: Feb. 20, 2024

(54) GENERATING APP OR WEB PAGES VIA EXTRACTING INTEREST FROM IMAGES

(71) Applicant: eBay Inc., San Jose, CA (US)

(72) Inventors: Benjamin Daniel Krogh, Portland, OR (US); Constanza Maria Heath, Cannon Beach, OR (US); Dustin Brown, Canby, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/745,999

(22) Filed: May 17, 2022

(65) Prior Publication Data

US 2022/0277053 A1    Sep. 1, 2022

Related U.S. Application Data

(63) Continuation of application No. 16/215,039, filed on Dec. 10, 2018, now Pat. No. 11,341,207.

(51) Int. Cl.
| | |
|---|---|
| *G06F 16/958* | (2019.01) |
| *G06F 16/583* | (2019.01) |
| *G06F 16/908* | (2019.01) |
| *G06F 16/9536* | (2019.01) |
| *G06F 16/55* | (2019.01) |
| *G06Q 30/06* | (2023.01) |

(Continued)

(52) U.S. Cl.
CPC .......... *G06F 16/958* (2019.01); *G06F 16/55* (2019.01); *G06F 16/583* (2019.01); *G06F 16/908* (2019.01); *G06F 16/9536* (2019.01); *G06F 40/205* (2020.01); *G06Q 30/0641* (2013.01)

(58) Field of Classification Search
CPC .... G06F 16/958; G06F 16/583; G06F 16/908; G06F 16/9536; G06F 16/55; G06F 40/205; G06Q 30/0641
See application file for complete search history.

(56) References Cited

U.S. PATENT DOCUMENTS 6,018,728 A * 1/2000 Spence .................. G06V 10/25
706/20
7,031,965 B1   4/2006 Moriya et al.
(Continued)

OTHER PUBLICATIONS

Xie et al., "Mining User Interests from Personal Photos", Carnegie Mellon University, 2015, 7 pages.

*Primary Examiner* — Etienne P Leroux
(74) *Attorney, Agent, or Firm* — Shook, Hardy & Bacon L.L.P.

(57) ABSTRACT

A plurality of images are received from one or more social media platforms associated with a user. For a selected image of the plurality of images, a plurality of text descriptions are generated. The plurality of text descriptions are computer-generated captions that describe features of the selected image of the plurality of images. The plurality of text descriptions are processed through a natural language processing model. Based on processing, a plurality of interest contexts are derived from the plurality of text descriptions. A mapping of each of the plurality of interest contexts to one or more predefined categories associated with an online marketplace is generated. Based the mapping of each of the plurality of interest contexts to the one or more predefined categories, a user device associated with the user is caused to display an app page or web page associated with the one or more predefined categories.

20 Claims, 8 Drawing Sheets

(51) Int. Cl.
    *G06F 40/205* (2020.01)
    *G06Q 30/0601* (2023.01)

(56) References Cited

U.S. PATENT DOCUMENTS

| | | | | |
|---|---|---|---|---|
| 7,614,552 | B2* | 11/2009 | Roseman | G06Q 30/02 |
| | | | | 235/383 |
| 10,176,611 | B2 | 1/2019 | Felt et al. | |
| 10,425,501 | B2* | 9/2019 | Nasson | G06F 16/958 |
| 10,860,642 | B2* | 12/2020 | Rose | G06F 16/908 |
| 11,074,646 | B1* | 7/2021 | Singhal | G06Q 30/0641 |
| 11,080,342 | B2* | 8/2021 | Bejerasco | G06F 16/953 |
| 11,341,207 | B2 | 5/2022 | Krogh et al. | |
| 2002/0038299 | A1 | 3/2002 | Zernik et al. | |
| 2004/0243485 | A1 | 12/2004 | Borenstein et al. | |
| 2005/0240488 | A1 | 10/2005 | Grendel et al. | |
| 2006/0212792 | A1* | 9/2006 | White | G06F 16/958 |
| | | | | 715/255 |
| 2008/0228544 | A1 | 9/2008 | Woosley et al. | |
| 2013/0246896 | A1* | 9/2013 | Barnes | G06F 16/958 |
| | | | | 715/202 |
| 2015/0256568 | A1 | 9/2015 | Osmond et al. | |
| 2016/0048567 | A1* | 2/2016 | Rao | G06F 16/3325 |
| | | | | 707/722 |
| 2016/0180402 | A1 | 6/2016 | Sabah et al. | |
| 2016/0180428 | A1* | 6/2016 | Cain | G07C 5/08 |
| | | | | 705/26.61 |
| 2016/0350868 | A1* | 12/2016 | Votaw | G06F 16/9537 |
| 2017/0046483 | A1* | 2/2017 | Reicher | G06F 16/245 |
| 2017/0098170 | A1 | 4/2017 | Sardela Bianchi et al. | |
| 2017/0116658 | A1 | 4/2017 | Baid et al. | |
| 2018/0130072 | A1 | 5/2018 | Ouimet et al. | |
| 2018/0137855 | A1 | 5/2018 | Lee et al. | |
| 2018/0300789 | A1* | 10/2018 | Li | G06F 16/951 |
| 2018/0322206 | A1 | 11/2018 | Sun et al. | |
| 2018/0341907 | A1 | 11/2018 | Tucker et al. | |
| 2019/0139110 | A1* | 5/2019 | Chechuy | G06Q 30/0603 |
| 2019/0387055 | A1* | 12/2019 | Varvello | H04L 67/1097 |
| 2020/0183989 | A1 | 6/2020 | Krogh et al. | |
| 2021/0208741 | A1* | 7/2021 | Yang | G06F 3/04845 |

* cited by examiner

| | FOOD & PARTIES | HOME DÉCOR & INTERIOR DESIGN | OUTDOORS | PETS | MY KIDS | TECH |
|---|---|---|---|---|---|---|
| IMAGE OF JOHN FISHING AT A LAKE ON BRAND X BOAT | | | ✓ | | | |
| IMAGE RECIPE FOR TUNA SALAD | ✓ | | | | | |
| IMAGE OF A MAPLE WOOD DESK WITH A WHITE VASE AGAINST A LAVENDER WALL | | ✓ | | | | |
| IMAGE RECIPE FOR CHOCOLATE CHIP COOKIES | ✓ | | | | | |
| IMAGE RECIPE FOR CHERRY PIES | ✓ | | | | | |
| IMAGE OF A BRAND X BOAT | | | ✓ | | | |

FIG. 3

GENERATING APP OR WEB PAGES VIA EXTRACTING INTEREST FROM IMAGES

CROSS-REFERENCE TO RELATED APPLICATIONS

This application is a continuation of, and claims priority from, U.S. patent application Ser. No. 16/215,039, filed on Dec. 10, 2018, the contents of which is hereby incorporated by reference in its entirety.

BACKGROUND

After launching a web browser or other client application, users typically either enter a Uniform Resource Locator (URL) or provide search engine terms for each information they desire (e.g., documents, links, product titles, etc.). Each set of information is typically provided via a set of web or app pages that include a graphical user interface (GUI). Once these web or app pages have been provided, users typically perform various manually-driven app or web page clicks, queries, or other selections to arrive at information that is of most interest to them. With the ever-increasing use of web and app services, improvements in computing functionality for these services can provide more efficient processing and rendering of web and app pages and efficiency in user navigation of GUIs.

SUMMARY

Embodiments of the present disclosure relate to methods, systems and computer storage media for generating web or app pages based on deriving, from images (e.g., digital photographs), inferences of user interests. By way of background, identifying and articulating, what users' interests are, is a challenge in order to provide users with the most useful web or app navigation experience. For example, some web-based technologies require users to fill out multi-page interest forms so that the users can indicate their interests (e.g., hiking, cooking, etc.) in order to provide the user with relevant web pages based on their interests. However, a lot of users do not fill out these forms, they require manual computer data entry from users, and require a lot of time and effort to fill out. Further, some users may not be able to fully articulate their specific interests in a single sit down session to fill out these interest forms. Moreover, users have to navigate and click through several different layers of a user interface for every new attempt to find an item of interest (e.g., a specific product of a product listing). In this regard, performing a search or other item of interest using a web or app service can often include several manual actions of trial and error query keywords, clicks, selections, and corresponding review of search result items interfaces to potentially identify items that align with the user's search intent or specific interests. As such, an alternative approach for rendering web or app pages would improve computing operations and user interface navigation.

Embodiments described in the present disclosure are directed towards improving the rendering and processing of web pages and/or app pages. In particular, and according to various embodiments, by way of example, social media APIs are used to communicate with external resources to automatically obtain one or more images (e.g., photographic images). Then the photographs can be automatically run through computer vision or other object recognition models to describe each photograph in detail in the way a human would. The output can be a textually rich sentence describing the photograph in detail, as opposed to a blanket description of what the "jist" or main portion of the photograph contains. Each photograph output can then be run through a Natural Language Understanding (NLU) model in order to derive meaning (e.g., semantic context, intent, etc.) of the output and derive interest contexts. The data to train the NLU model can come from various data sources, such as worldwide news media articles. Then a classifier can be used to map each output of the NLU model to known predefined interest categories of the central platform (e.g., EBAY interest categories, such as "outdoors," "pets," "my kids," etc.). In some embodiments, based on a threshold quantity of predefined categories that are populated, a dynamic web page or app page can be generated. For example, if the majority of the photographs included outdoor-related photographs, such as a particular boat, a hiking trail, a lake, mountains, etc. the system can cause display of a boat for sale that is the same brand as the particular boat captured in the photograph.

In operation, according to particular embodiments, an image is received; a plurality of text descriptions that are computer-generated captions that describe a feature of the image are generated (e.g., photograph of a red apple on a circular table). The plurality of text descriptions are processed through a natural language processing (NLP) model (e.g., an NLU model). Based on processing the plurality of text descriptions, a plurality of interest contexts are derived. An image-inferred mapping of each of the plurality of interest contexts to one or more predefined categories are generated. Based on the imaged-inferred mapping of each of the plurality of interest contexts to the one or more defined categories, a user device associated with the user is caused to display an app page or web page associated with the one or more defined categories.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 3 is a schematic diagram illustrating a mapping of text descriptions or interest contexts to predefined categories, in accordance with embodiments described herein.

DETAILED DESCRIPTION

Figure 1:
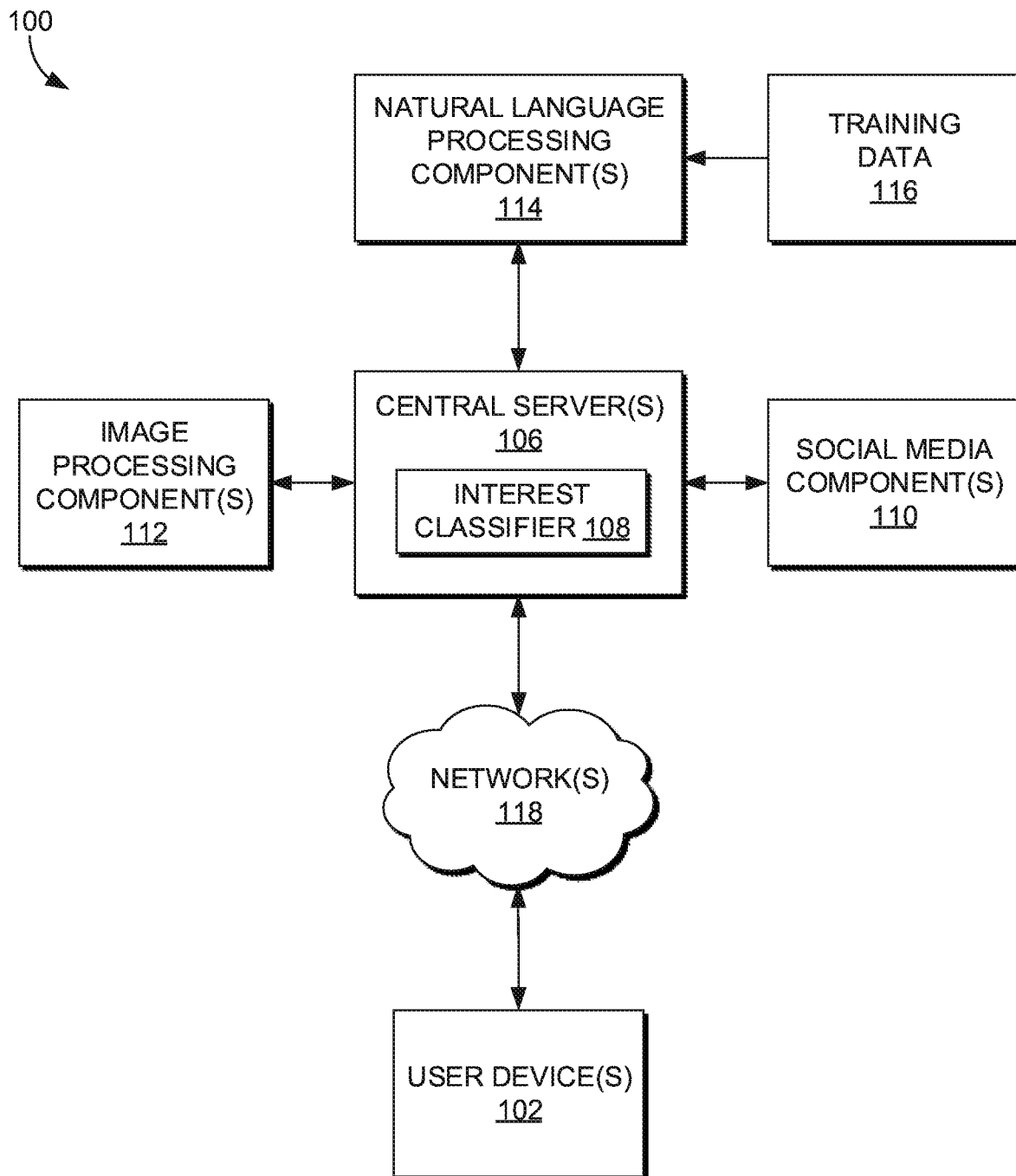
FIG. 1 is a block diagram of a computing environment, in which embodiments described herein may be employed.

Web services or applications support rendering web pages or app pages in order to provide users items of interest (e.g., product listings, documents, links, search results, etc.). Web services or applications can specifically be provided for content platforms or item listing platforms such as EBAY content platform, developed by EBAY INC., of San Jose, California. When a web or app page is rendered, often users have to manually input a query in a search engine to find a relevant item (e.g., a particular book that she wants to buy). In various situations, the user may have to repetitively and manually enter several queries before a desired item is found according to her specific interest. Additionally, the information that is displayed on a web or app page (e.g., a home landing web page of a user) may be of little relevance for a user such that none of the information robustly reflects users' interests.

Conventional app or web pages, such as virtual shopping web pages, are either created statically (e.g., they are not generated based on past user selections of a specific user that has initiated a session) or if they are created more dynamically, they are either inaccurate or require a lot of manual computer input effort. For example, some technologies require users to manually input data to digital multi-page interest forms so that the users can indicate their interests to provide web pages, as described above. Further, in order to find particular items that reflect users' interests, users often have to manually click, query, or drill down several views or layers of graphical user interfaces before an item is located. This may make it arduous and slower for a user to navigate through the user interface to obtain relevant information.

Consequently, using these manual-based interfaces may be costly for users who need to find the most relevant information according to their interests in the quickest amount of time. Moreover, such repetitive clicks, selections, or queries often increase storage device I/O (e.g., excess physical read/write head movements on non-volatile disk) because each time a user inputs unnecessary information, such as inputting several queries, the computing system has to reach out to the storage device to perform a read or write operation, which is time consuming, error prone, and can eventually wear on components, such as a read/write head. Further, if users repetitively issue queries, it is expensive because processing queries consume a lot of computing resources (e.g., decrease throughput, increase in network latency, etc.). For example, an optimizer engine of a database manager calculates a query execution plan (e.g., cardinality, selectivity, etc.) each time a query is issued, which requires a database manager to find the least expensive query execution plan to fully execute the query. This can be time consuming and decreases throughput and increases network latency.

Although some technologies include Application Programming Interfaces (APIs) to communicate with other platforms to infer likes or dislikes, such as social media posts, or other plain textual comments, such texts do not always catch a full spectrum of interest. For example, popular social media sites, such as PINTEREST, are configured to exchange images or photographs with little to no textual input or comments. In an illustrative example, a user may simply pin specific décor layout images or recipe images without commenting textually, yet the image pins themselves are highly relevant of their interest.

Some conventional technologies may also include algorithms that classify photos derived through APIs of other platforms. However, these algorithms are not accurate in identifying user interests. In various cases, conventional systems process detailed photograph (e.g., color and texture rich home décor), make simple classifications (e.g., "home décor"), and automatically cause display of an item for sale. For example, a chandelier item for sale that matches the home décor classification is automatically caused to be displayed. However, not all photographs are indicative of ones interests. Further, not all user interests are captured in generic classifications of photographs. Various embodiments of the present disclosure improve these existing web and app rendering technologies. Embodiments described herein implement new functionalities that these existing technologies or computing devices do not now employ, such as generating interest contexts from text descriptions. Further, various embodiments improve computer operations (e.g., reduce disk I/O). For example, some embodiments improve existing software technologies by automating tasks (e.g., automatically inferring user interests and/or automatically rendering items within a web page) via certain rules. In an example illustration, as soon as a user indicates his or her desire for a platform to contact an external social media service provider (e.g., a first rule), the platform may automatically extract photographs, automatically process the photographs via a classification model, automatically run text descriptions through a natural language processing model, automatically map the output of the NLP model to predefined categories and responsively automatically render web or app pages, as described in more detail below. As described above, the operations for deriving interests are not automated in various existing technologies and have only been historically manually input by users (e.g., via digital interest forms). These rules may allow for improved techniques for inferring a full spectrum of user interests for rendering web or app pages.

Particular embodiments also improve these existing software technologies by placing relevant information that reflects users' full spectrum of interests in a single web or app page (e.g., a home page or landing page). For example, instead of the users issuing various queries and selections to find a relevant product title description (e.g., Movie X), the product title description is automatically provided to a graphical user interface page. In this way, users do not have to keep manually issuing queries or making selections. Accordingly, because users do not have to keep manually entering information or selections, storage device I/O is reduced and query optimizers are not as often utilized, which allows for a reduction in computing query execution plans and thus increased throughput and decreased network latency. For example, a read/write head in various embodiments reduces the quantity of times it has to go to disk to read records, which may reduce the likelihood of write errors and breakage of the read/write head. In like manner, because information that reflects a full spectrum of users' interests can be provided on a single web or app page, users do not have to drill down several layers of a graphical user interface to obtain relevant information. This may increase users' navigation speed in order to find the needed relevant information.

By way of background, the web or app pages can be part of a product listing platform that supports access to a product database within an online market place. The products in the product database may be stored based on a data structure having a structural arrangement of products (e.g., a product category and a product classification system). For example, a product database may be implemented with a database schema that stores product listings based on product titles. Products in the product database can further include product descriptions and product reviews. As an initial matter, products, and by extension product titles, may be associated with product descriptions and product reviews. Product descriptions describe elements or aspects of a product. For example, a product description may include a description of the benefits of using the product.

At a high level, embodiments of the present disclosure are directed to generating web or app pages based at least on one or more selected images. In operation, one or more images are received (e.g., from one or more social media platforms associated with a user). For example, social media data is obtained via a social media platform API, then the data is parsed to obtain image URLs. One or more text descriptions can then be generated, which describe one or more features of the one or more images. In various embodiments, the one or more text descriptions are computer-generated captions (e.g., a brief explanation or summarization) that describe an entire image and/or one or more features of the image. For example, a text description that describes an image may read "image of person wearing green top hat." In particular embodiments, generating or obtaining the one or more text descriptions includes processing or receiving processed data via a first classifier model. A "classifier model," as described herein is or includes any algorithm, data structure, and/or machine learning model that classifies or categorizes a set of input (e.g., text descriptions, interest context, etc.). For example the first classifier model (or any classifier model described herein) can be a convolutional neural network (CNN), computer vision model, or other object recognition model as described herein In some embodiments, the one or more text descriptions are processed through a NLP model. For example, the one or more text descriptions may describe a photograph without any semantic or other context (e.g., the context of the current news). Accordingly, when the text descriptions are run through a NLP model, additional and/or fewer terms corresponding to context can be added and/or removed from the text descriptions. In some embodiments, these additional and/or fewer terms added/subtracted from the one or more text descriptions are one or more derived "interest contexts." An interest context thus provides context or meaning to text descriptions. For example, referring to the example above, the text description of "image of person wearing green top hat," can be modified to be "green top hat, public figure Y, style of music B," (an interest context). The NLP model thus provides additional context (e.g., semantic context) to the text descriptions. In this example, training data may indicate that a particular public figure music celebrity, which plays music style B (e.g., as indicated in a corpus of various news sources) always wears the green top hat. Accordingly, in this way, additional user interest insight can be extracted from text descriptions to allow for a robust mechanism to determine user interest. This is in contrast to typical functionality that simply classifies photographs and responsively performs actions, such as provide user interfaces. As is illustrated in the example above, interest contexts can include additional characters or words than text descriptions to provide more context. Alternatively, in some embodiments, the interest contexts summarize or categorize each text description into one or fewer character sequences than the text description itself (e.g., text description=John, standing on boat, wearing sports team Y shirt; interest context=outdoors). Accordingly, the interest context in various embodiments includes fewer characters or word sequences than the text descriptions. In various instances, a mapping, is then generated, of the one or more interest contexts to one or more predefined categories. A "mapping" is or includes a data structure and/or a model that associates data, such as the interest contexts to the one or more predefined categories. In various embodiments, the generating of the mapping includes processing one or more interest contexts through a second classifier model, such as a word embedding vector model (e.g., WORD2VEC) such that the output is one or more predefined categories. For example, in response to running one or more terms of the interest context "John fishing at a lake on brand X boat" through a classifier model, an "outdoors" predefined category is populated since this is the category that best fits the description of this interest context as determined by the closest word in vector space to one or more of the terms in the interest context. A "predefined category" as described herein is or includes a class or category that a platform has already generated before any run-time processing associated with receiving and processing images to generate and render web or app pages. For example, categories can be generated before the processing of any of the blocks described in FIG. 6, which is described in more detail below. In various embodiments, these predefined categories correspond to categories of item listing or products for sale in an online marketplace.

An app page or web page associated with the one or more predefined categories is then caused to be displayed in some embodiments. A web page can be or include browser-based page (e.g., HTML) that is linked to other pages (e.g., to form a website) and accessed over the internet. An app page is an application page (e.g., an activity in ANDROID operating system) that is typically installed within a device, as opposed to being rendered within a browser like a web page. A server may provide an app or web page, over a network, to one or more user devices. In this way, the user using a user device can interface with elements on the web or app page that more closely match his or her interests according to the one or more images that were derived.

Turning now to the Figures, FIG. 1 is a block diagram of a computing environment 100, in accordance with some embodiments. Although the computing environment 100 describes specific components at a specific quantity it is understood that any combination of the components and quantity may exist. For example, in some embodiments, the computing environment 100 does not include the natural language processing component(s) 114 or training data 116. In some embodiments, each of the image processing component(s) 112, central server(s) 106, social media component(s) 110, the natural language processing component(s) 114, and the training data 116 are all included in the same physical computing device host (e.g., computing device 800 of FIG. 8). For example, in some embodiments, some or each of the components represent particular compute instances of a single computing device (e.g., program modules, computing components within a chassis, a blade server within a blade enclosure, an I/O drawer, a processor chip, etc.) In alternative embodiments, some or each of the components represent separate computing device entities or hosts that are only communicatively coupled via a computer network. For example, in some embodiments, the image processing component(s) 112 represents a first computing device or set of computing devices of a first service. Likewise, the social media component(s) 110 represents a second computing device or set of computing devices of a second service. The central server(s) 106 represents a third computing device or set of computing devices of a third service. The natural language processing component(s) 114 represent a fourth computing device or set of computing devices of a third service. In this manner, for example, each service may corresponds to a particular computing environment, such as a cloud computing environment. Consistent with various embodiments, a cloud computing environment includes a network-based, distributed/data processing system that provides one or more cloud computing services. Further, a cloud computing environment can include many computers, hundreds or thousands of them or more, disposed within one or more data centers and configured to share resources over the one or more network(s) 118. In some embodiments, the central server(s) 106 includes the image processing component(s) 112 and/or the natural language processing component(s) 114, and/or the training data 116.

These components can communicate with each other and the user device(s) 102 via the network(s) 118, which can be or include any suitable network such as a local area network (LAN), a general wide area network (WAN), and/or a public network (e.g., the internet).

The one or more social media component(s) 110 include any social media platform or other repository that includes images. These images represent digital photographs in accordance with some embodiments. In particular embodiments, an "image" or "images" described herein additionally or alternatively represents video sequences or individual frames that are extracted from videos. In some embodiments, the social media component(s) 110 are or include social media platforms where the majority of user interaction occurs via uploading one or more images, as opposed to inputting text. For example, in some embodiments the one or more social media component(s) 110 are or include services such as PINTEREST Inc. of San Francisco, California and INSTRAGRAM Inc. of New York City, New York In various instances users download and post various photograph images on social media platforms, which are indicative of their interests. For example, users can upload an images (e.g., recipes or quotes) that he or she likes from the user device(s) 102 (e.g., a photograph stored on a mobile device) to a data store associated with the social media component(s) 110. The image can also be a personal photograph, which is indicative of interests. For example, the image may be a photograph showing a person with a particular sports team attire.

The one or more central servers 106 represent one or more computing devices that generate a mapping (e.g., a specific hash table data structure) of one or more text descriptions or interest contexts to one or more predefined categories. A "text description" as described herein is a computer-generated caption that describe one or more features of one or more images (e.g., selected from the one or more social media component(s) 110). For example, in response to the image processing component(s) 112 obtaining one or more images that were uploaded to the social media component(s) 110, the image processing component(s) 112 processes the one or more images through a first classifier model. Such a classifier model can be or include any suitable model. For example, the model may be or include decision tree classifiers, rule-based classifiers, neural networks (e.g., Convolutional Neural Network (CNN)), WORD2VEC model, support vector machines, and/or naïve Bayes classifiers. The output includes a computer-generated caption that describes the images, such as "a screenshot of a cell phone," which is an example of a text description.

In various embodiments, a text description(s) does not just describe the "jist" or overall topic of an image, but describes each (or majority) feature or sub-image within a larger image. For example, an image may be a picture of John with sports team Y cap and shirt. John may be standing in front of restaurant B. The text descriptions as described herein may describe each feature of the image, such as the type of hat, shirt, person, building or other objects in the image. Accordingly, the text description for this image may be "John standing in front of restaurant A with team Y cap and shirt." In this way, user interest is more likely to be extracted from images.

An "interest context" as described in particular embodiments is one or more textual sequences of characters that are the output of an NLP model (e.g., the natural language processing component(s) 114). Alternatively or additionally, in some embodiments interest contexts are additional filters or descriptions (e.g., semantic meaning and/or topic of the text descriptions) that are derived from one or more text descriptions and are indicative a particular user's interest. An interest context includes one or more character sequences that describe context (e.g., semantic context) of a text description. The context being indicative of an interest of the user. Interest contexts provide more meaning or context than text descriptions. For example, in response to the image processing component(s) 112 processing one or more images of the social media component(s) 110 to provide a text description output of the one or more images, the text description is processed through the natural language processing component(s) 114 to provide an interest context when coupled with the training data 116.

NLP derives semantic and syntactic content of semi-structured or unstructured data (e.g., data in image files, data in blogs, posts, websites, text descriptions of classifier models, etc.). This is in contrast to analyzing "structured" data, such as data in a database. In certain embodiments, the natural language processing component(s) 114 is a software tool, component, or other program configured to determine interest contexts of unstructured data. More particularly, the natural language processing technique can be configured to parse one more text description features to determine semantic context (e.g., meaning of a text description by analyzing each word in the text description against each other and against training data 116) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech, and/or the context of surrounding words. Other syntactic and semantic elements are also possible. Based on the analyzed metadata, contextual information, syntactic and semantic elements, and other data, the natural language processing technique generates the interest contexts. In certain embodiments, the natural language processing component(s) 114 or any other NLP process described herein is configured to infer interest contexts even when a word is not stated explicitly in a text description.

The training data 116 is or includes a repository of historical resources (e.g., news feeds, documents, links, web pages, electronic books, electronic recipes, images, etc.), which represent data points to help generate interest contexts via training algorithms. In this manner, the natural language processing component(s) 114 make predictions based on associations or patterns within the data points. In some embodiments, these predictions are based on using data mining and machine learning techniques. "Machine learning" as described herein, in particular embodiments, corresponds to algorithms that parse or extract features of historical data (e.g., the training data 116), learn (e.g., via training) about the historical data by making observations or identifying patterns in data, and then receive a subsequent input (e.g., a text description processed by the image processing component(s)) 112) in order to make a determination, prediction, and/or classification of the subsequent input based on the learning without relying on rules-based programming (e.g., conditional statement rules). In some embodiments NLP models are trained based on one or more news articles or media topics. In this manner additional term(s) are added to one or more text descriptions based on information contained in the one or more news articles or media topics. For example, a text description reads "blue socks," but various media sources may have run news stories about a particular movie called "blue socks." Accordingly, an interest context may read "blue socks, movie, actors X, Y."

In another example illustration, the training data 116 may include several variations of a quote that a particular famous person Y always states. Accordingly, a machine learning algorithm may predict that any time it receives a variation of the quote, it must have been stated by the person Y or someone who is referring to the person Y in some way. Therefore, a user may have uploaded an image of a quote from a social media service that states the quote. After an image processing component (e.g., image processing component(s) 112) processes the image quote, the output or text description may simply be the quote verbatim. However, in response to the text description being processed through a natural language processing model (e.g., the natural language processing component(s) 114), the interest context output description may read "quote of Person Y." This rich description and the interest context descriptions described herein are far more able to articulate user interest because images are not simply described but the context, patterns, and associations surrounding the image descriptions are also extracted based on historical data points, thereby making it more likely that user interests are captured.

The central server(s) 106 include the interest classifier 108. An interest classifier as described herein in various embodiments is a second classifier model that generates a mapping of each interest context to one or more predefined categories. For example, the interest classifier 108 and any other classifier described herein can include a data structure (e.g., a hash table) that maps interest contexts to online marketplace categories, such as "football," "hockey," "formalwear," "beach," etc. based on running one or more terms of the interest context through a model. Such mapping may either be performed via user selections and/or via automated processes that utilize algorithms such as TF-IDF and/or word embedding vector models. For example TF-IDF can be used to extract important words from an interest context. Each of these extracted words can be fed through a word embedding vector model (e.g., WORD2VEC) to determine what word or set of words are closest to the extracted words in vector space. The closest words may represent the "predefined category" that the extracted word belongs to. TF-IDF algorithms include numerical statistics that infer how important a query word or term is to a data set. "Term frequency" illustrates how frequently a term of a query occurs within a data set (e.g., an interest context.), which is then divided by the data set length (i.e., the total quantity of terms in the data set). "Inverse document frequency" infers how important a term is by reducing the weights of frequently used or generic terms, such as "the" and "of," which may have a high count in a data set but have little importance for relevancy of a query. Word embedding vector models are described in more detail herein. The interest classifier 108 allows a system to be able to render web or app pages. For example, if the predefined category of "football team X" was selected as the output of a mapping of the interest context, an online marketplace (e.g., the central server(s) 108) may cause a display to the user device(s) 102 of several product listings on a web page (e.g., football team X cap, football team X sweater, football team X mug, etc.).

Figure 2:
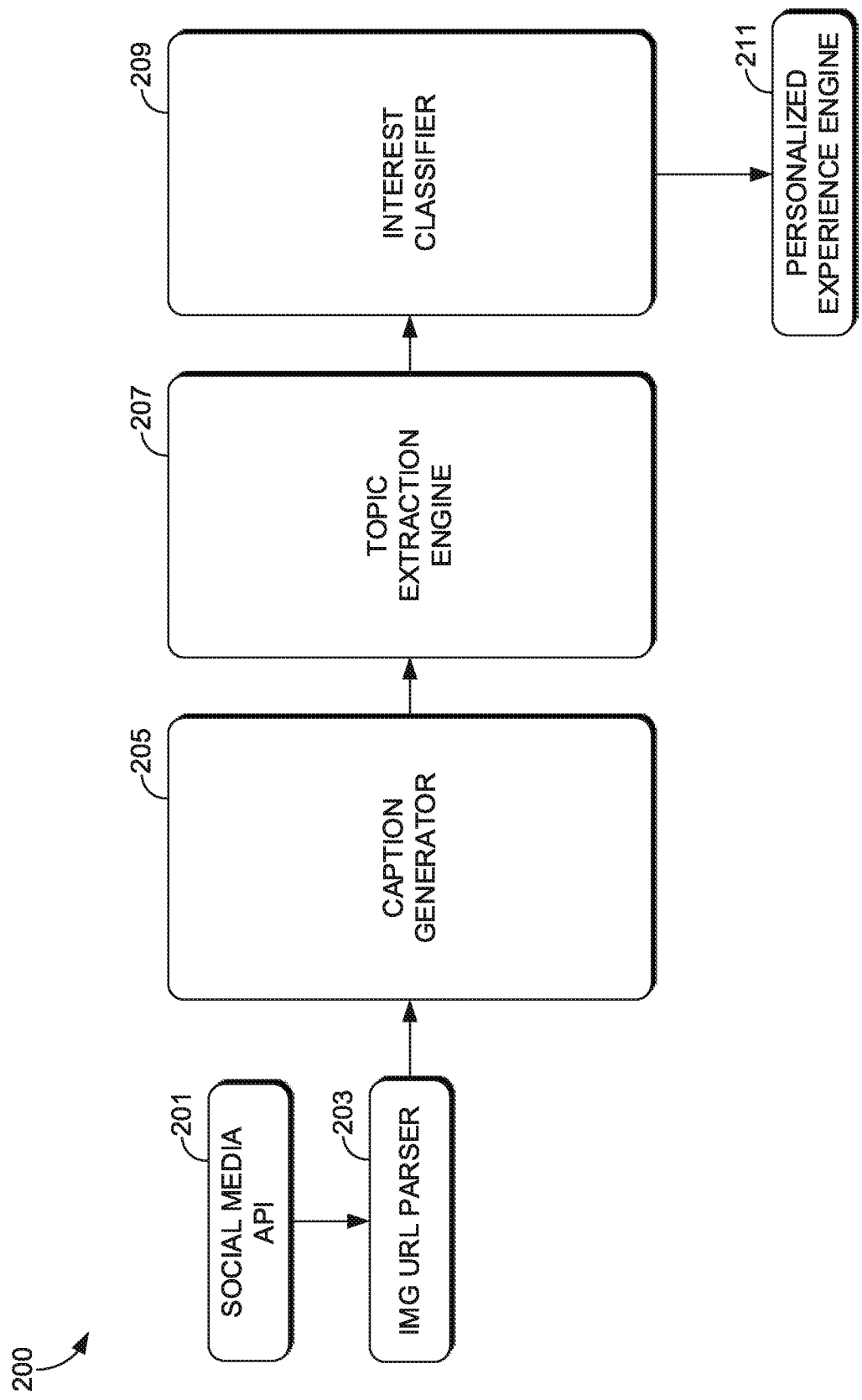
FIG. 2 is a block diagram of an example system, in which embodiments described herein may be employed.

FIG. 2 is a block diagram of an example system 200, according to some embodiments. In particular embodiments, some or each of the components are also included in the computing environment 100 of FIG. 1. Likewise, some or each of the components in FIG. 1 in particular embodiments are included in some or each of the components in the system 200. For example, in some embodiments, the social media API(s) 201 is interface code configured to obtain resources from the social media component(s) 110 of FIG. 1. Likewise, the image URL parser 203 is or is included in the image processing component(s) 112 of FIG. 1 in particular embodiments. The caption generator 205 is or is included in the image processing component(s) 112 of FIG. 1 in some embodiments. In various embodiments, the topic extraction engine 207 is or is included in the NLP component(s) 114 of FIG. 1. Likewise, the interest classifier 209 is or is included in the interest classifier 108 of FIG. 1.

The social media API(s) (Application programming interface) 201 is one or more application programming interfaces configured to interface with at least another separate unit of code for communication and data retrieval purposes. For example, the social media component(s) 110 of FIG. 1 may include the social media API(s) 201 that are configured to obtain image URLs (Uniform Resource Locators) of particular images and other social media data (e.g., text-based posts) in response to other code (e.g., within the central server(s) 106) interfacing with the API(s) 201 corresponding to a query for data.

In response to receiving one or more image URLs and other social media data (e.g., posts, user IDs, metadata, etc.), via the social media API(s) 201, the image URL parser 203 parses the data to obtain or extract the specific information needed, such as user IDs, and URL links of images. The image URL parser 203 is a data exchange format module that reads heterogeneous social media data and extracts relevant information, such as image URLs. In some embodiments, the image URL parser 203 formats data into attribute-value pairs. For example, a first attribute may be a first user ID and an associated value (e.g., a particular integer). A second attribute and associated value may be each photographs associated with the user that the user has posted. In this way, if a particular user signs into his or her social media account (e.g., from the central server(s) 106), the image URL parser 203 may parse the user's ID and associated image URLs corresponding to the images that the user has ever uploaded to the social media service. In some embodiments, the image URL parser 203 is or includes any suitable parser, such as a JSON parser to extract URLs.

The caption generator 205 in various embodiments is or includes a first classifier model that processes each image (e.g., from the image URL parser 203) that a user uploaded to the social media service. Accordingly, after the image URLs have been parsed via the URL parser 203, the caption generator 205 can select each link, which points to and opens the link such that the entire photograph is shown for processing. The processing includes generating one or more text descriptions that are computer-generated captions that describe features of a selected image. For example, in some embodiments, the caption generator 205 is or includes one or more neural networks. In some embodiments, the caption generator 205 is or includes a computer vision classifier model. Processing of images through the computer vision classifier model causes the features (e.g., corners, color, edges, shapes, etc.) of the selected image(s) to be extracted and the selected image is classified based on the features being extracted such that the processing causes the plurality of text descriptions to be generated. Accordingly, computer vision algorithms work by extracting feature vectors (e.g., integers) from images and using these features to classify images (e.g., features resemble a boat, so the picture is of a boat).

In an example illustration of how machine learning models can be used to classify images, one or more neural networks (e.g., convoluted neural networks) can be used. The neural network can include a convolutional layer, a pooling layer, and a fully connected layer. The machine learning model neural network may be fed or receive as input one or more images associated with image URLs at the convolutional layer. Each input image can be transformed into a 2-D input vector array of values, such as integers of ones and zeroes. Each value represents or describes a particular pixel of the image and the pixel's intensity. For instance, each line or edge of a box in the image can be denoted with a one and each non-line can be represented with zeroes. The convolutional layer utilizes one or more filter maps, which each represent a feature (e.g., a sub-image of a sports shirt) of the input image (e.g., a home décor feature within a larger picture that shows someone with a sports shirt on, etc.). There may be various features of an image and thus there may be various linearly stacked filter maps for a given image. A filter map is also an array of values that represent sets of pixels and weights where a value is weighted higher when it matches a corresponding pixel or set of pixels in the corresponding section of the input image. The convolution layer includes an algorithm that uses each filter map to scan or analyze each portion of the input image. Accordingly, each pixel of each filter map is compared and matched up against a corresponding pixel in each section of the input image and weighted according to similarity. In some embodiments, the convolutional layer performs linear functions or operations to arrive at the filter map by multiplying each image pixel value with its own value and then performing a summation function of each product, which is then divided by the total quantity of pixels in the image feature.

In particular embodiments, the pooling layer reduces the dimensionality or compresses each feature map by picking a window size (i.e., a quantity of dimensional pixels that will be analyzed in the feature map) and selecting the maximum value of all of the values in the feature map as the only output for the modified feature map. In some embodiments, the fully connected layer maps votes for each pixel of each modified feature to each classification (e.g., text descriptions in in particular captions). The vote strength of each pixel is based on its weight or value score. The output is a score (e.g., a floating point value, where 1 is a 100% match) that indicates the probability that a given input image or set of modified features fits within a particular defined class (e.g., T-shirt of sports team X). For example, an input image may include a first picture of a box that has a large dent. The classification types may be "water damage," "puncture damage," and "dent damage." After the first picture is fed through each of the layers, the output may include a floating point value score for each damage classification type that indicates "water damage: 0.21," "puncture damage: 0.70," and "dent damage: 0.90," which indicates that the box of the parcel image likely has experienced dent damage, given the 90% likelihood. Accordingly, the output text description or caption may read, "box with dent damage."

Training or tuning of the neural network can include minimizing a loss function between the target variable or output (e.g., 0.90) and the expected output (e.g., 100%). Accordingly, it may be desirable to arrive as close to 100% confidence of a particular classification as possible so as to reduce the prediction error. This may happen overtime as more training images and baseline data sets are fed into the learning models so that classification can occur with higher prediction probabilities. In an example illustration of the processing of the caption generator 205, one or more images that originated from a social media service may be fed through the caption generator 205. The image may be a photograph that depicts sunset at a beach, with a folding table on the sand. The table may include a mug with symbol A. The text description or caption of the image may read, "image of a beach at sunset and a mug with symbol A sitting on a table."

The topic extraction engine 207 associates one or more topics and/or other contexts (e.g., semantic context) to the text descriptions outputted by the caption generator 205. In some embodiments, the topic extraction engine 207 is or includes a Natural Language Understanding (NLU) module that is a subset of NLP in which a meaning, topics, entities, sentiments, and/or intents are derived from the text descriptions to more fully expand on or filter the text descriptions. An "intent" is a verb (e.g., activities that people or objects are doing in pictures). For example, according to the illustration caption above "sitting" may be an intent. An "entity" is a noun or content for the intent that is or is needed. Referring to the example above, "beach," "image," "sunset," "mug," "symbol A," and "table," may be the entities. One or more text descriptions are processed in order to derive one or more interest contexts from the one or more text descriptions. For example, referring to the illustration above, the text description "image of a beach at sunset and a mug with symbol A sitting on a table," is run through the topic extraction engine 207. The output interest context may be "sunset, beach symbol A, Brand T, Athlete C." The values of "Brand T and Athlete C" were added in the interest context, which may be because of training algorithms, as described herein. For example, symbol A may be a logo of a brand that Athlete C started. Accordingly, instead of merely describing the picture in terms of symbol A, training data may indicate that the logo is associated with additional information, such as an athlete who started the corresponding business. The interest classifier 209 generates a mapping of each interest context derived from the topic extraction engine 207 to one or more predefined categories. In some embodiments however, the text descriptions derived from the caption generator 205 are alternatively or additionally run through the interest classifier 209. Likewise, in some embodiments, the system does not include the topic extraction engine 207 such that interest contexts are not derived from the text descriptions. Rather, the text descriptions generated by the caption generator 205 are fed straight to the interest classifier 209 instead of the topic extraction engine 207.

In an example, using the illustration above, one or more terms of the interest context of "sunset, beach, symbol A, Brand T, Athlete C," are run through the interest classifier 209. The interest classifier 209 may be included, for example, in a network-based marketplace where particular items for sale have particular pre-defined categories of "Athlete C," "outdoors," "recipes, etc. The terms "sunset" and "beach" may be mapped to the predefined category of "outdoors," and the "Brand T" and "Athlete C" may be mapped to the predefined category of "Athlete C." In some embodiments, the generating of the mapping is or includes utilizing one or more word embedding vector models. Word embedding vectors models are machine learning models that associate each input word to other trained words in vector space. Some or each word in vector space includes each predefined category in particular embodiments. Accordingly, predefined category words that are closest to the input words in vector space (e.g., via Cosine distance) are selected to generate the mapping. For example, using the illustration above, the input terms "sunset" and "beach" may be closest, in cosine distance, in vector space to the predefined categorical term of "outdoors," compared to other terms, such as "recipes." Therefore, these terms are "mapped" to the "outdoors" term.

The personalized experience engine 211 generates or renders an app or web page based on the mapping of the one or more interest contexts (and/or the text descriptions) to the one or more predefined categories. The personalize experience engine 211 further supports causing display, on a user device associated with a user, an app page or web page associated with the one or more predefined categories. For example, using the illustration above, the personalized experience engine 211 can provide images, product listings or other data that describe or are associated with "Athlete C," and "outdoors" themes. For example, the personalized experience engine 211 can cause display of a product title associated with a product that is part of Athlete C's business. The generating and rending of web pages and app pages are described in more detail herein. FIG. 3 is a schematic diagram illustrating a mapping 300 of text descriptions or interest contexts to predefined categories, according to some embodiments. In various embodiments, the mapping 300 is or is included in the interest classifier 108 of FIG. 1 and/or the interest classifier 209 of FIG. 2. It is understood that the particular values, predefined categories, and descriptions described in FIG. 3 are representative only and that the mapping 300 may include any suitable values, predefined categories, and descriptions. The mapping 300 in particular embodiments is or includes a data structure, such as a hash table that includes an attribute of text descriptions or interest contexts and values that describe various predefined categories.

The mapping 300 includes the predefined categories of "foods and parties," "home décor and interior design," "outdoors," "pets," "my kids," and "tech." Each record in the mapping 300 corresponds to a particular image and what predefined category the corresponding text description and/or interest context is mapped to. For example, for the record 303, the text description/interest context of "image of John fishing at a lake on brand X boat" is mapped to the predefined category of "outdoors," within the column 301. Accordingly, this text description/interest context is not mapped to other unrelated categories, such as "foods and parties," "pets," etc. In some embodiments, each text description and/or interest context is mapped to two or more categories, as opposed to only one. In some embodiments, the categories are more specific than illustrated in FIG. 3, such that one or more words in a text description (e.g., corresponding to one or more sub-features in an image) and/or interest context is mapped to a category. For example, for the text description of "John fishing at a lake on brand X boat," "fishing," "lake," and "X boat" can each be pre-defined categories that are mapped to for this image, as opposed to a generic "outdoors" category for each term in the text description/interest context.

The mapping 300 illustrates that the majority of images that were obtained fit within the "foods and parties" category, given that the user has uploaded various images that detail various recipes. In some embodiments, web or app pages are rendered based on threshold quantity of predefined categories that are selected or populated (e.g., within the mapping 300). For example, referring to the mapping 300, the threshold may be 3 or more selected categories, and because 3 categories have been populated corresponding to the "foods and parties" category, web pages or app pages are rendered based on this category. For example, only items associated with "foods and parties" are provided for display on a web page or app page, which means that no other category within the mapping 300 is provided for display. Alternatively, the majority or a threshold quantity of elements (e.g., product listings) associated with foods and parties may be provided to the web page or app page, notwithstanding that there is fewer units of information depicting or describing other categories within the mapping 300 in particular embodiments. For example, elements associated with "home décor and interior design" can still be presented to a web page an app page. In some embodiments, web or app pages are rendered alternatively or additionally based on each individual feature within each image (e.g., as described with reference to the "Athlete C" example above) or text description/interest context, as opposed to a threshold quantity of categories that are selected. For example, even though there is only one "home décor and interior design" category selected via the image that describes "image of a maple wood desk with a white vase based against a lavender wall," this may be highly relevant for someone's interest particularly with home décor. Accordingly, "white vase," "maple wood desk," and "lavender walls" may each be predefined categories, and listing or other information associated with these terms may be rendered or provided to a web or app page. For example, a "white vase" product listing may be provided for sale in an online market place even though it is just a feature of an image that does not describe the entire image. These embodiments illustrate that particular features or sub-images themselves can be extracted from images and used for generating app or web pages, as opposed to providing a web or app page of a generic description of an image. Accordingly, each feature of each image can be highly indicative of one's interests. These embodiments also contemplate situations where just because a user uploads images that are dominant in one category, it may be because of a particular phase or time of year (e.g., Christmas), but that does not necessarily mean that he/she is and will always show what he or she is interested in.

Figure 4:
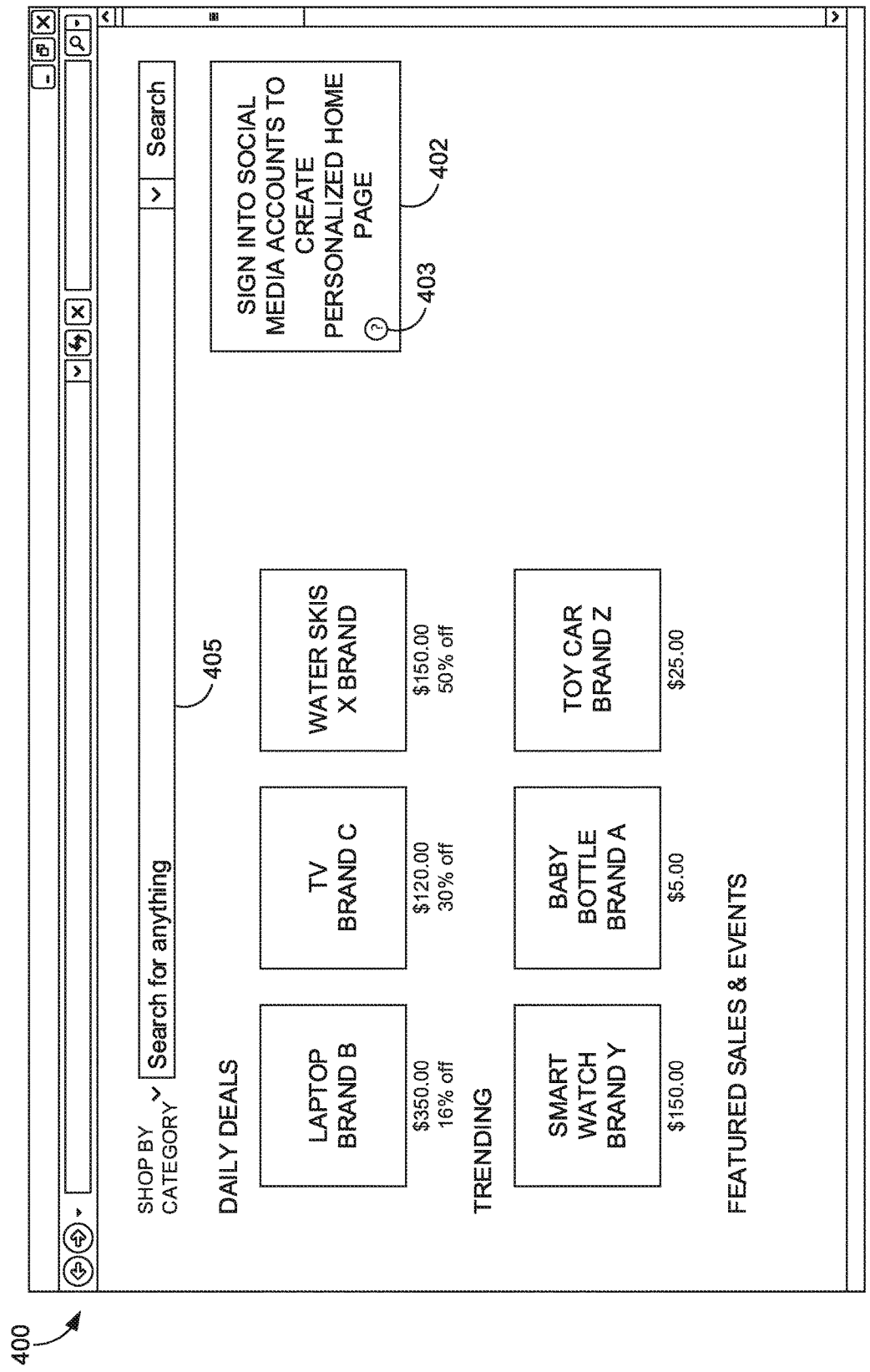
FIG. 4 is a screenshot of a web or app page at a first time before any processing is done to render pages based on mapping one or more interest contexts or text descriptions to one or more predefined categories, in accordance with embodiments described herein.

FIG. 4 is a screenshot 400 of a web or app page at a first time before any processing is done to render pages based on mapping one or more interest contexts or text descriptions to one or more predefined categories, according to particular embodiments. In some embodiments, the screenshot 400 represents a graphical user interface as it appears before any functionality occurs as described by some or each of the processes with reference to FIG. 1, FIG. 2 and FIG. 3, except for the feature 402. Although the screenshot 400 (and 500 of FIG. 5) describes a particular online marketplace environment where particular products are offered for sale, it is understood that the web or app pages can alternatively or additionally include other data, such as a search engine results page, a website, a document, etc.

In some situations, a user can open a client application, such as a web browser, and URL corresponding to a particular website or portal. In response to receiving the user's URL request, an entity, such as the central server(s) 106 may provide or cause to be displayed to a user device (e.g., the user device 102), the screenshot 400 of FIG. 4. A "portal" as described herein in some embodiments includes a feature to prompt authentication and/or authorization information (e.g., a username and/or passphrase) such that only particular users are allowed access to information. A portal can also include user member settings and/or permissions and interactive functionality with other user members of the portal, such as instant chat. In some embodiments a portal is not necessary to provide the user interface, but rather any of the views can be provided via a public website such that no login is required (e.g., authentication and/or authorization information) and anyone can view the information. In yet other embodiments, the screenshots represent an aspect of a locally stored application, such that a computing device hosts the entire application and consequently the computing device does not have to communicate with other devices (e.g., the central server(s) 106) to retrieve data.

As a part of onboarding or registering a particular user, the feature 402 (e.g., a button, window, popup, etc.) is provided that allows the user to sign into, via providing credentials, his or her social media account(s) in order to create a personized home page. In various aspects, the screenshot 400 (and/or 500) is not a web page or app page of a social media platform itself, but provides the feature 402 in order to retrieve data from the social media platform. In some embodiments, the feature 402 is provided as an automatic popup window in response to the user logging into a portal. The feature 403 may be selected in order to provide the user with more information that explains that with this feature, the user's photographs will be extracted from each social media account that he or she signs into in order to provide a richer page rendering experience. Accordingly, in response to the user selecting information associated with the feature 402, prompts for each password for each predefined social media service may be provided for display. The user may then input each password. Additionally, in some embodiments, other information is obtained from social media services, such as textual posts of users and is indicated as much via selection of the feature 403, for example.

Figure 5:
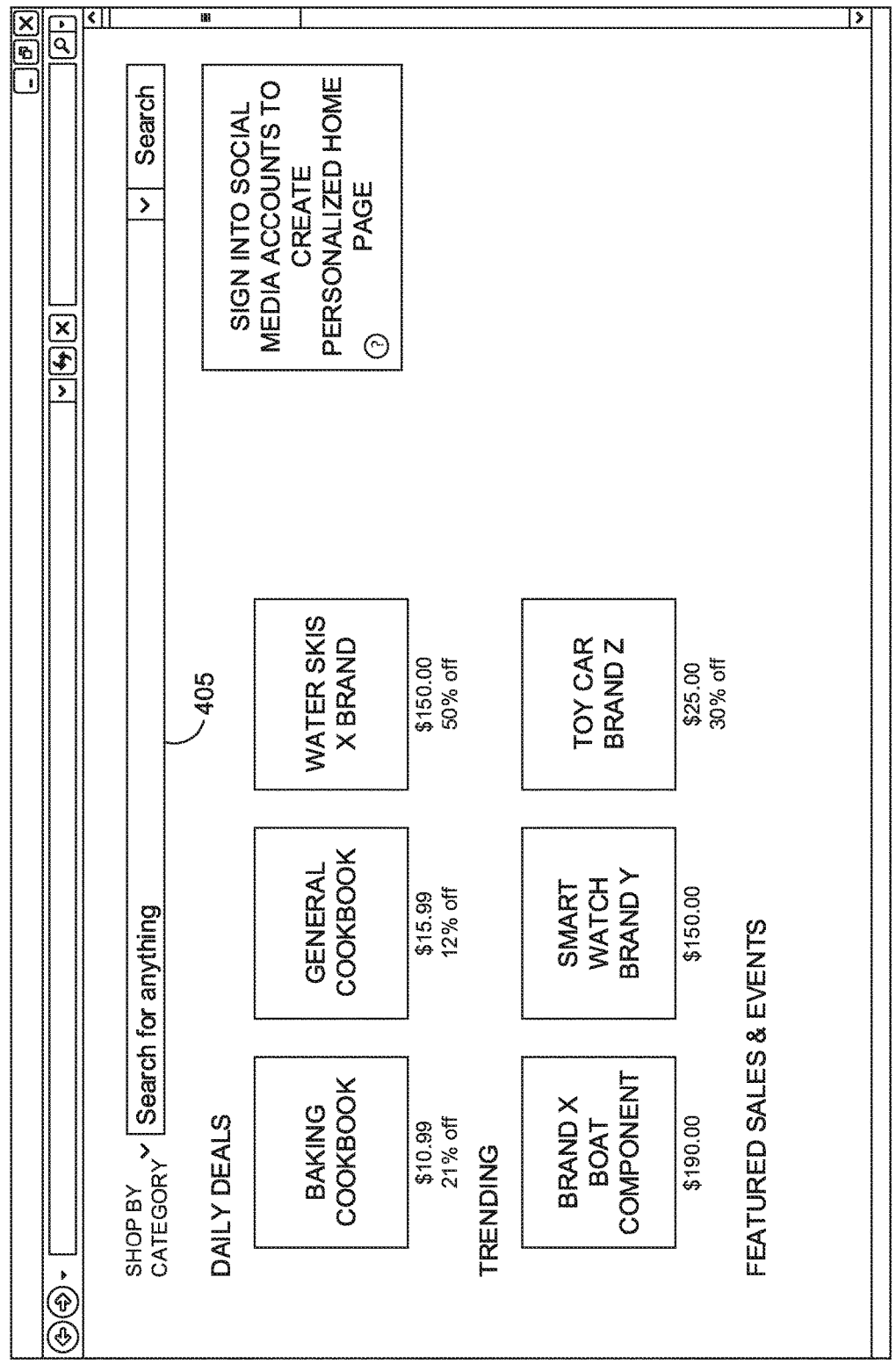
FIG. 5 is a screenshot of the web or app page of FIG. 4 at a second time after processing is done to render pages based on mapping one or more interest contexts or text descriptions to one or more predefined categories, in accordance with embodiments described herein.

FIG. 5 is a screenshot 500 of the web or app page of FIG. 4 at a second time after processing is done to render pages based on mapping one or more interest contexts or text descriptions to one or more predefined categories, according to particular embodiments. In various embodiments, the screenshot 500 represents the screenshot 400 at a later time after the user has logged in to each of his or her social media accounts associated with the feature 402 of FIG. 4. Accordingly, the screenshot 500 in particular embodiments illustrates the rendering or displaying of a particular web or app page in response to the processes described with respect to FIG. 1-FIG. 3. Therefore, this web page or app page screenshot 500 is a modified version of the web page or app page screenshot 400 of FIG. 4. Any modification of web or app pages described herein can include removing elements (e.g., listings are removed from the screenshot 400) from a web or app page, adding elements (e.g., new listings are presented to the screenshot 400) to a web or app page, or otherwise changing elements.

FIG. 5 illustrates various online marketplace identifiers (e.g., "baking cook book") corresponding to listings for products for sale. In particular embodiments, and as illustrated in FIG. 5, the order of presentation of listings for display is based on the generating of the mapping of one or more interest contexts to one or more predefined categories. This displayed order thus corresponds to the ranking of identifiers or associated products for sale based on the predefined categories that are populated. Such ranking or order of presentation can be based on such orientations such as a "top-to-bottom" continuum where the higher ranked or most important identifiers are displayed to a top of a page and the lower ranked or least important is displayed near the bottom of a page. Alternatively or additionally, such orientations can include a "left-to-right" continuum where higher ranked identifiers are displayed on the left side of a page and lower ranked identifiers are displayed towards the rights side of the page.

In an example illustration, referring back to FIG. 3, the "foods and parties" category was populated the most compared to the other categories, and specifically the recipes in the images mostly contained baking items, such as "chocolate chip cookies," and "cherry pies." Consequently, under the "Daily Deals" header or identifier, the "baking cookbook" listing is displayed first or furthest to the left. Likewise, the "general cookbook" identifier is displayed in the middle, and the "water skis X brand" is displayed last or furthest to the right. Each of these ordered presentation of listings reflect populated columns or categories in the mapping 300. That is, because the "foods and parties" category was populated at the highest quantity (i.e., 3), the first two listings "baking cookbook," and "general cookbook" are presented furthest to the left. Likewise, because the "outdoor" category was populated at the second highest quantity (i.e., two times), the "water skis brand X" listing is also listed. Accordingly, no listing associated with any of the other categories are displayed. However, as described above, the rendering and display of particular elements of a web page or app page, such as listing identifiers are not necessarily made based on a quantity of times categories are populated, but are made based on each individual feature of each input image. Accordingly, in some embodiments, the "Daily Deals" header also includes other listings associated with other populated categories, such as "Home Décor and Interior Design," based on the input image of "a maple wood desk with a white vase against a lavender wall." However, in some embodiments this associated listing is demoted to a less prominent display (e.g., furthest to the right or near the bottom of a page).

Compared to FIG. 4, FIG. 5 illustrates that the display elements under the "Daily Deals" and "Trending" identifiers have changed significantly in response to processes described herein (e.g., the operations described in FIG. 2). For example, in FIG. 4, the identifiers under the "Daily Deals" are ordered from "laptop brand B," to "TV brand C," to "water skis X brand." However, under the same "Daily Deals" header, the identifiers "Baking cookbook" and "general cookbook" have been added. Accordingly, the modified screenshot 500 is preceded by a removal or replacement of the "laptop Brand B" and "TV brand C" listings as indicated in the screenshot 400 by the "baking cookbook" and "general cookbook" listings. The listing "water skis X brand," however remains in the same position. This removal, addition, and/or unaltered listings or other elements in their particular positions is based on the generating of the mapping of one or more interest contexts (or text descriptions) to one or more predefined categories, as described above. In some embodiments, and as illustrated in FIG. 4 and FIG. 5, only individual elements are modified while other elements are not modified. For example, as illustrated, the search engine interface 405 is identically displayed in both screenshots 400 and 500. Likewise, the specific identifier of "Daily Deals" is identically displayed in both screenshots 400 and 500.

Figure 6:
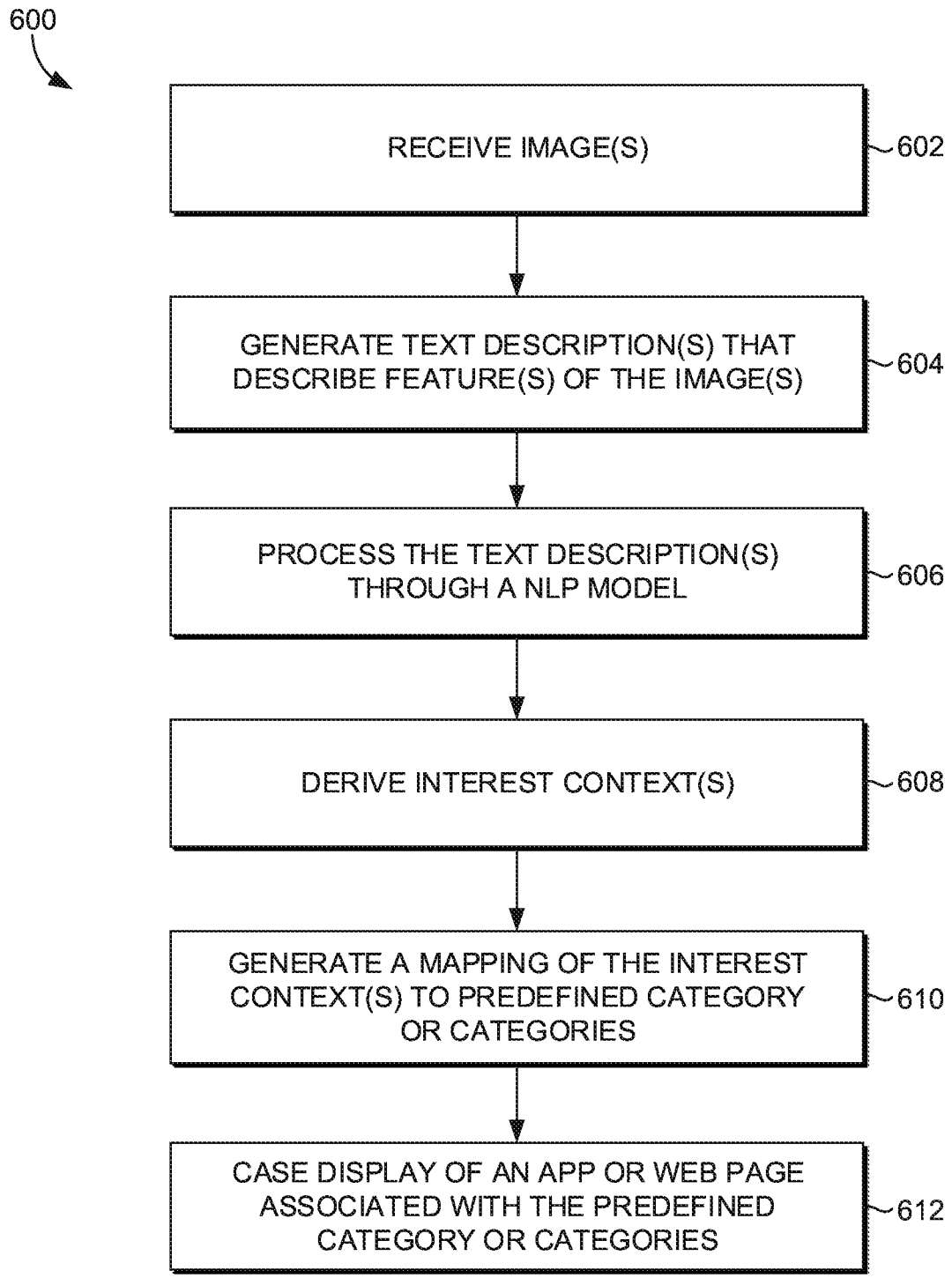
FIG. 6 is a flow diagram of an example process for causing display of a web page or app page, in accordance with embodiments described herein.

FIG. 6 is a flow diagram of an example process 600 for causing display of a web page or app page, according to particular embodiments. The process 600 (and/or any of the functionality described herein (e.g., process 700) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein.

Per block 602, one or more images are received (e.g., from one or more social media platforms associated with a user). For example, referring back to FIG. 1, the central server(s) 106 receives an image or set of images from the one or more social media component(s) 110. Per block 604, one or more text descriptions are generated (e.g., by the image processing component(s) 112 of FIG. 1) that describe one or more features of the one or more images. In various embodiments, the one or more text descriptions are computer-generated captions that describe an entire image and/or one or more features of the image. In particular embodiments, generating or obtaining the one or more text descriptions includes processing or receiving processed data via a first classifier model, such as a CNN, as described herein.

Per block 606, the one or more text descriptions are processed (e.g., by the natural language processing component(s) 114) through a NLP model. In some embodiments, however, blocks 606 and 608 do not exist or are optional, such that block 604 continues to block 610 except that instead of generating a mapping of interest context(s) to predefined category(s), the generating of the mapping include mapping the one or more text descriptions to one or more predefined categories. In an example illustration of blocks 606 and 608, the text descriptions may describe a photograph without any semantic or other context (e.g., the context of the current news). Accordingly, when the text descriptions are run through a NLP model, additional terms corresponding to context can be added to the text descriptions. These additional terms added to the one or more text descriptions are the one or more derived interest contexts per block 608 in particular embodiments. Per block 610, a mapping is generated (e.g., by the interest classifier 108) of the one or more interest contexts to one or more predefined categories. In various embodiments, the generating of the mapping includes processing one or more interest contexts through a second classifier model, such as a word embedding vector model, such that the output is one or more predefined categories. For example, referring back to FIG. 3, in response to running the interest context through a classifier model that reads, "John fishing at a lake on brand X boat," the "outdoors" predefined category is populated since this is the category that best fits the description of this interest context. In various embodiments, these predefined categories correspond to categories of item listing or products for sale in an online marketplace. For example, referring back to FIG. 3, "foods and parties," "home décor and interior design," and the rest of these categories may all be categories of products that are for sale in the online marketplace.

Per block 612, an app page or web page associated with the one or more predefined categories is caused to be displayed. For example, referring back to FIG. 1 and FIG. 5, the one or more central servers 106 provide an app or web page, such as the screenshot 500 of FIG. 5 is displayed to the one or more user device(s) 102. In this way, the user using a user device can interface with elements on the web or app page that more closely match his or her interests according to the one or more images that were derived at block 602.

Figure 7:
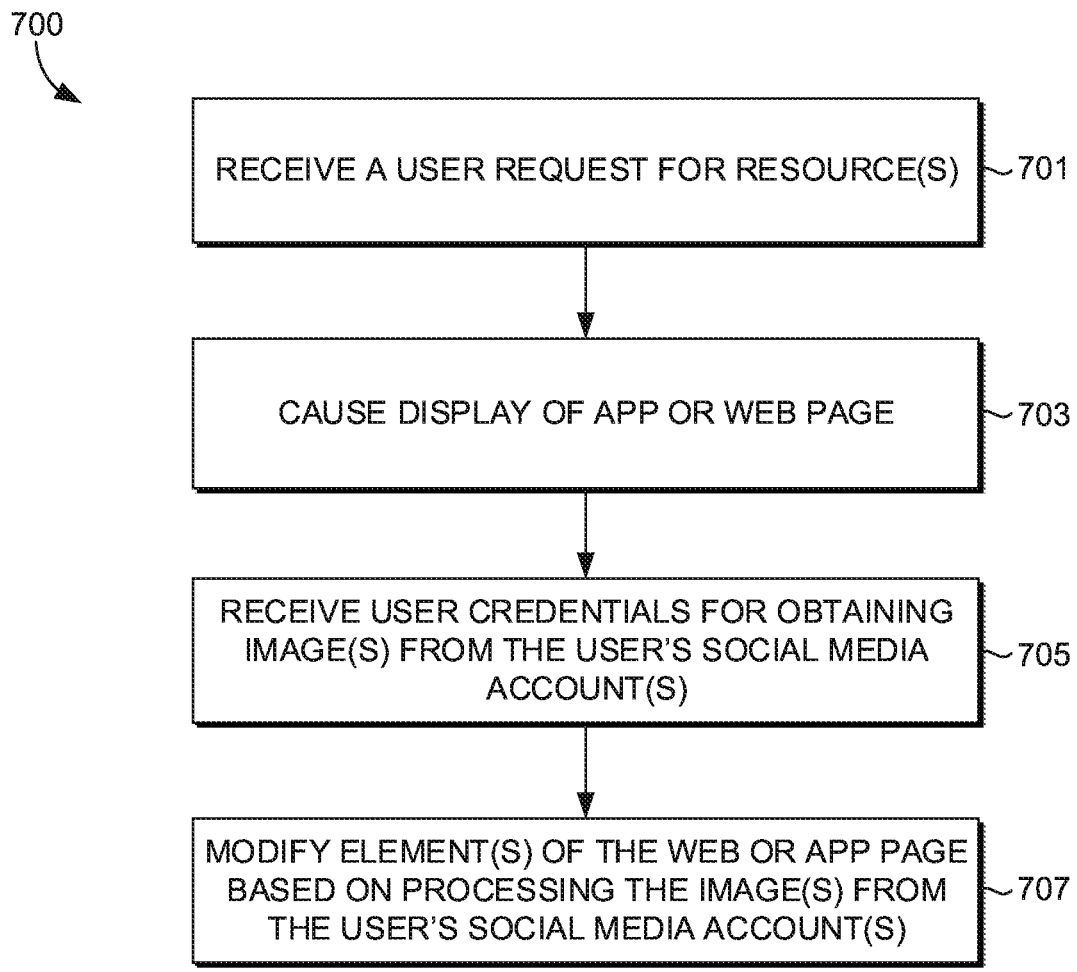
FIG. 7 is a flow diagram of an example process for modifying one or more elements of a web page or app page, in accordance with embodiments described herein.

FIG. 7 is a flow diagram of an example process 700 for modifying one or more elements of a web page or app page, according to some embodiments. Per block 701, a request for one or more resources (e.g., documents, links, websites, listings, products, etc.) are received. For example, in response to the user device 102 issuing a query input by a user on a search engine interface, an app page or web page is caused to be displayed (e.g., by the central server(s) 106) to the user device 102 per block 703. For example, referring back to FIG. 4, the screenshot 400 is provided to the user device 102.

Per block 705, one or more user credentials (e.g., a username and/or a password) for obtaining one or more images from the user's social media account(s) are received. For example, after signing into an account associated with a first platform (e.g., the central server(s) 106), the user may additionally input credentials to the first platform. The obtaining of these credentials is a first rule in order to automate the rest of the process 700 in some embodiments. After the user is authenticated and authorized via the social media credentials, the first platform may utilize an API (e.g., the API 201 of FIG. 2) of the one or more social medial account to obtain images or image URLs as described herein.

Per block 707, one or more elements of the web page or app page are automatically modified (e.g., by the personalized experience engine 211 of FIG. 2) based on processing the one or more images from the user's one or more social media accounts. In various embodiments, the "processing" according to block 707 includes some or each of the blocks 602, 604, 606, 608, and 610 of the process 600 of FIG. 6, which may all be automated processes. For example, modified elements can include one or more inserted or removed product listings, product descriptions, search result identifiers, buttons, images, symbols, windows, and/or any suitable GUI or web/app page feature with respect to the original web page or app page at block 707. In an example illustration, referring back to FIG. 5, the modified screenshot 500 includes additional product listings that the screenshot 400 did not include.

Figure 8:
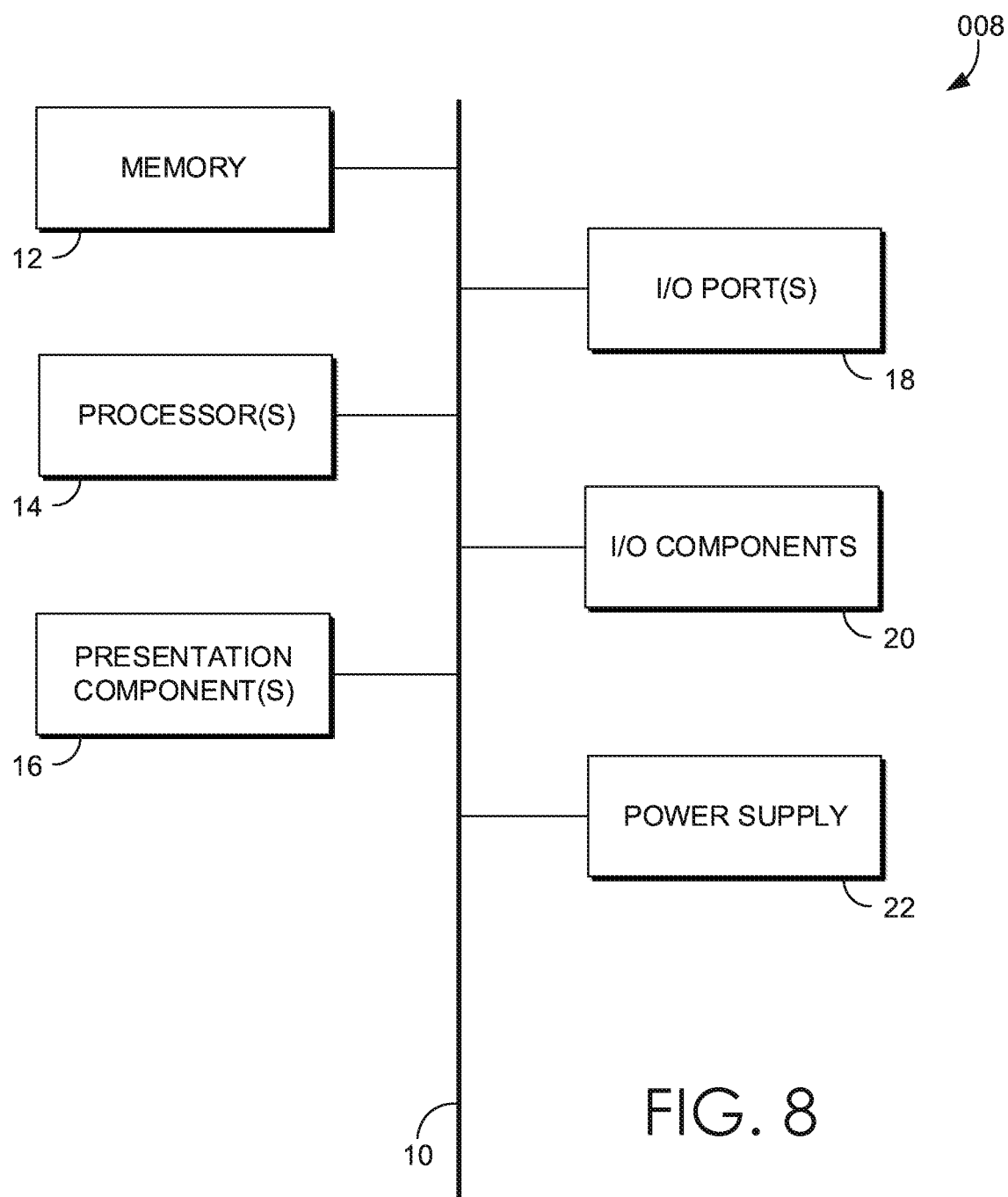
FIG. 8 is a block diagram of an example computing device suitable for use in implementing embodiments described herein.

Having described an overview of embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc. Then memory 812 may include program instructions, that when executed by one or more processors, cause the one or more processors to perform any operation described herein, such as the processes 600 and 700 of FIG. 6 and FIG. 7.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

In various embodiments, the computing device 800 is or is included in various components described herein. For example, the user device(s) 102 may include the components of the computing device 800. Likewise, the central server(s) 106, the image processing component(s) 112, the social media component(s) 110, and/or the natural language processing service(s) 114 may be embodied by the computing device 800.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the search system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method comprising:
    causing presentation of a web page or app page of an online marketplace platform that is configured to produce item listings describing one or more products for sale based on a user query, the web page or app page of the online marketplace platform including a user interface element that is selectable to access a social media account of a social media platform that is distinct from the online marketplace platform;
    subsequent to receiving an indication that the user interface element has been selected, causing user credentials of the social media account and a user to be received;
    automatically extracting one or more images from the social media account in response to the user credentials being authenticated;
    in response to the extraction of the one or more images, obtaining one or more text descriptions that describe one or more features of the one or more images;
    determining one or more predefined categories that each of the one or more text descriptions belong to, the one or more predefined categories correspond to one or more categories of item listings or products for sale at the online marketplace platform; and
    based at least on the determining and the selection of the user interface element, automatically modifying one or more elements of the web page or the app page of the online marketplace platform.

2. The method of claim 1, wherein the extracting includes extracting a plurality of Uniform Resource Locators (URLs) of the plurality of images based on parsing data received via one or more Application Programming Interfaces (APIs) of a social media platform associated with the social media account.

3. The method of claim 1, wherein the obtaining of the one or more text descriptions is based on processing the one or more images through a first classifier model, the first classifier model operating as a computer vision classifier model, the processing causes the one or more features of the selected image to be extracted and the one or more images are classified based on the one or more features being extracted, wherein the one or more features cause the one or more text descriptions to be generated.

4. The method of claim 1, further comprising:
    in response to the obtaining of the one or more text descriptions, deriving an interest context from the one or more text descriptions by adding at least a first natural language caption to a second natural language caption of the one or more text descriptions, and wherein the adding is indicative of providing additional context to the one or more text descriptions.

5. The method of claim 4, wherein deriving of the interest context is based on using a natural language processing (NLP) model that is trained to learn patterns associated with the one or more text descriptions.

6. The method of claim 1, wherein the mapping associates the user with the one or more images, and associates the one or more images with the one or more predefined categories, and wherein the one or more predefined categories correspond to categories of item listing or products for sale in an online marketplace associated with the web page or app page of the platform.

7. The method of claim 1, wherein the mapping comprises a data model based on the plurality of images, the plurality of text descriptions, the plurality of interest contexts, and the one or more predefined categories, wherein the data model relates data elements from each of plurality of images, the plurality of text descriptions, the plurality of interest contexts, and the one or more predefined categories.

8. One or more computer storage media having computer-executable instructions embodied thereon that, when executed, by one or more processors, cause the one or more processors to perform a method, the method comprising:
    causing presentation of a web page or app page of an online marketplace platform that is configured to produce item listings describing one or more products for sale based on a user query, the web page or app page of the online marketplace platform including a user interface element that is selectable to access one or more images;
    based on a request to access the one or more images, extracting the one or more images;
    in response to the extraction of the one or more images, obtaining one or more text descriptions that describe one or more features of the one or more images;
    determining one or more predefined categories of the platform that each of the one or more text descriptions belong to, the one or more predefined categories correspond to one or more categories of item listings or products for sale at the online marketplace platform; and
    based at least on the determining and the selection of the user interface element, causing display, at a user device associated with the user and at the app page or web page of the online marketplace platform, of at least one listing of at least one product for sale at the online marketplace platform that belongs to the one or more predefined categories.

9. The one or more computer storage media of claim 8, wherein the one or more images are stored on at least one of: a user device associated with the user or a database associated with a social media platform.

10. The one or more computer storage media of claim 8, based on the mapping, the method further comprising automatically modifying one or more elements of the web page or the app page, wherein the app page or web page includes one or more product listings associated with one or more products for sale in an online marketplace.

11. The one or more computer storage media of claim 8, wherein the extracting includes extracting a URL of the one or more images based on parsing data received via one or more Application Programming Interfaces (APIs) of one or more social media platforms.

12. The one or more computer storage media of claim 8, wherein the method further comprises:
in response to the obtaining of the one or more text descriptions, deriving an interest context from the one or more text descriptions by adding at least a first natural language caption to a second natural language caption of the one or more text descriptions, and wherein the adding is indicative of describing, in more detail, a feature of the one or more images in natural language.

13. The computer storage media of claim 8, wherein the method further comprises, based on the mapping, modifying an order of presentation of one or more product listings for sale, and wherein the displaying includes the modified order of presentation.

14. The computer storage media of claim 8, wherein the method further comprises adding a product listing to the app page or the web page based on the mapping, and wherein the product listing is associated with a semantic context of the one or more images.

15. A system comprising:
one or more processors; and
one or more computer storage media storing computer-useable instructions that, when used by the one or more processors, cause the one or more processors to:
cause presentation of a web page or app page of an online marketplace platform that is configured to produce item listings describing one or more products for sale based on a user query, the web page or app page including a user interface element that is selectable to access a social media account of a social media platform that is distinct from the online marketplace platform;
subsequent to receiving an indication that the user interface element has been selected, cause user credentials of the social media account and a user to be received;
automatically extract one or more images from the social media account in response to the user credentials being authenticated;
in response to the extraction of the one or more images, obtain one or more text descriptions that describe one or more features of the one or more images;
determining one or more predefined categories that each of the one or more text descriptions belong to, the one or more predefined categories correspond to one or more categories of item listings or products for sale at the online marketplace platform; and
based at least on the determining and the selection of the user interface element, automatically cause display, at a user device associated with the user and at the app page or web page, of at least one listing of at least one product for sale that belongs to the one or more predefined categories.

16. The system of claim 15, wherein the one or more processors are further caused to based on the mapping, modify one or more elements, the modifying includes removing a first set of product listings from the web page or app page and adding a second set of product listings to the web page or app page.

17. The system of claim 15, wherein the instructions further cause the one or more processors to process the one or more text descriptions through a natural language processing model to derive one or more interest contexts, the natural language processing model includes a natural language understanding feature that extracts a topic feature from the one or more text descriptions such that the one or more interest contexts contain more or fewer words than the one or more text descriptions.

18. The system of claim 17, wherein the one or more interest contexts include one or more terms added to the one or more text descriptions, wherein the one or more terms added further describe the one or more images based on training a model.

19. The system of claim 15, wherein the one or more images are indicative of multiple digital photographs that the user has liked on a social media platform associated with the social media account.

20. The system of claim 15, wherein the instructions further cause the one or more processors to extract a plurality of Uniform Resource Locators (URLs) of the one or more images based on parsing data received via one or more Application Programming Interfaces (APIs) of one or more social media platforms.

* * * * *